May 20, 1952     T. F. ESERKALN     2,597,716
MACHINE TOOL SPINDLE AND VARIABLE-SPEED DRIVE THEREFOR
Filed March 30, 1948     3 Sheets-Sheet 1
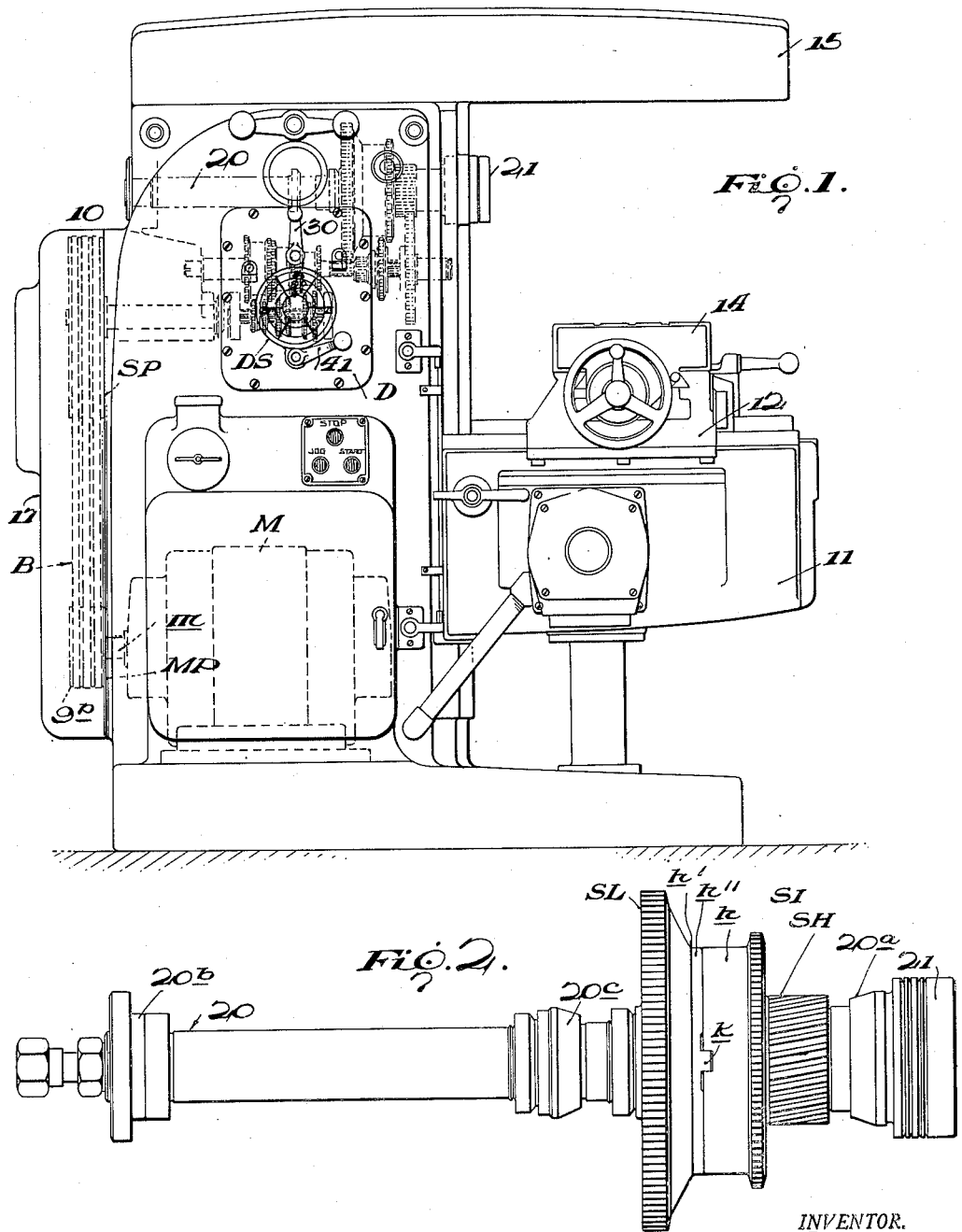
INVENTOR.
Theodore F. Eserkaln
BY
Peck + Peck
attorneys May 20, 1952  T. F. ESERKALN  2,597,716
MACHINE TOOL SPINDLE AND VARIABLE-SPEED DRIVE THEREFOR
Filed March 30, 1948  3 Sheets-Sheet 2

INVENTOR.
Theodore F. Eserkaln
BY
Peck + Peck
Attorneys.

May 20, 1952   T. F. ESERKALN   2,597,716
MACHINE TOOL SPINDLE AND VARIABLE-SPEED DRIVE THEREFOR
Filed March 30, 1948   3 Sheets—Sheet 3

Inventor
Theodore F. Eserkaln
By Peck & Peck
Attorneys.

Patented May 20, 1952

2,597,716

UNITED STATES PATENT OFFICE 2,597,716

MACHINE TOOL SPINDLE AND VARIABLE-SPEED DRIVE THEREFOR

Theodore F. Eserkaln, Wauwatosa, Wis., assignor to George Gorton Machine Co., Racine, Wis., a corporation of Wisconsin Application March 30, 1948, Serial No. 17,837

4 Claims. (Cl. 90—18)

The invention relates particularly to rotary spindles such as the so-called cutter spindles of milling machines and the like machine tools, and to a selectively variable change speed drive transmission therefor; and the nature and objects of the invention will be readily understood by those skilled in the arts involved in the light of the following explanation and detailed description of the accompanying drawings illustrating what I now believe to be the preferred embodiments or mechanical expressions of my invention from among various other forms, expressions, embodiments, arrangements, modifications, designs, constructions and combinations, of which the invention is capable within the spirit and scope thereof as defined by the hereinafter appended claims.

The primary problems with which my invention is concerned are those particularly encountered in providing for milling or the like machine tools of the relatively high powered, heavy duty types having a horizontally disposed cutter spindle, a variable or change speed drive of the gear type for driving the cutter spindle, in which the over-all range of speeds through which the spindle may be driven are obtained through selectively operable basic speed ranges and a speed change mechanism operatively common to all the speed ranges for varying the speed at which the cutter spindle may be driven through any one of the basic speed ranges selected for operation.

And a general object of the invention is to provide a design and arrangement for such a change speed spindle drive by which the number of basic speed ranges may be increased to thus increase the over-all speed range over which the cutter spindle may be driven, without mechanical or gearing complications and while maintaining compactness with simplicity of structure and high operating efficiency, so that such drive mechanism may be associated in efficient driving relation with a cutter spindle and may be located and efficiently mounted in a minimum of space within the basic frame or column structure provided by a horizontal spindle type of machine tool without requiring increase in the size or dimensions of such basic structure.

A further object is to provide a simplified gear train system for such a cutter spindle drive in which the number of "shift" controls necessary to effect speed changes throughout the over-all speed range of which the drive is capable, is reduced to a minimum.

Another object is to provide an arrangement of simple compound gear train units in the spindle drive and to so arrange such units that the secondary or driven gears of each unit attain maximum diameters and form a relatively large diameter weight mass for developing a substantial fly wheel effect acting on the shaft or spindle on which such driven gears are mounted.

Another object is to provide an arrangement of such a cutter spindle drive in which two shafts only are required between the power input point to the drive and the cutter spindle.

Another object of the invention is to reduce lateral deflection and torsional deflection on the driving and driven shafts associated with the gear trains.

Another object is to provide a change speed gear drive from a motor to a machine tool cutter spindle in which all the shafts associated with the gear trains of the drive between the motor shaft and the spindle are parallel to each other and to the axis of the motor shaft in order to eliminate any angle drives between the motor and the cutter spindle.

And a further object is to provide a design of a dual directional cutter spindle drive by which the axis of the cutter spindle and the axes of all the shafts associated with the gear trains of the drive between the motor and the spindle are located in the same plane in order to assure a minimum load on the shaft bearings and thus reduce to a minimum the possibility of cramping action when the drive is operated to rotate the spindle in one of its directions of rotation.

Another object is to provide a design and arrangement of such a drive in which at least three (3) basic speed ranges may be provided with a single change speed unit operative to effect speed changes over any selected one of the three (3) basic speed ranges.

Another object is to provide such a spindle drive having at least three (3) basic speed ranges defined by sets of pairs of range gears in which one of the range gears of each set is directly mounted on and carried by the cutter spindle, so that the cutter spindle itself thus directly mounts and carries at least three (3) range gears.

A further object is to provide a cutter spindle having at least three (3) range gears directly mounted thereon in which such gears are so located on the spindle as to apply the transmitted torque from any one of said gears to the spindle at a location on the spindle in close proximity to the front bearing therefor immediately adjacent the operating end or nose of the spindle.

Another object is to design the range gears so mounted directly on a cutter spindle, in such a manner that the gears will provide a substantial weight mass to develop for the spindle an effective fly-wheel effect acting in close proximity to the nose of the spindle.

Another object is to provide at least three (3) range gears directly mounted on a cutter spindle for selective operation to drive such spindle, and to so design, arrange and mount such gears that the gear spaced at the greatest distance inwardly on the spindle from the spindle nose will apply its torque to the spindle at a location spaced from the gear outwardly along the spindle toward and in close proximity to the operating end or nose of the spindle.

A further object is to provide a design and arrangement of a spindle drive that includes a change speed mechanism of the gear train type and a series of sets of pairs of range gears for selective operative association with the change speed mechanism, in which only two (2) active gear contacts defined by the engagement of two (2) gears of the change speed mechanism and by the engagement of the two (2) gears constituting the pair of range gears of the selected range, respectively, are required to be engaged and set up for driving the spindle for any speed setting of the speed change mechanism in any selected speed range, to thus decrease wear and maintenance and increase operating efficiency.

With the foregoing general objects, features and results as well as certain others in view, which others will be readily apparent from the following detailed description and explanation, my invention consists in certain novel features in design and construction of parts and elements and in combinations and arrangements thereof, all as will be more fully referred to and described hereinafter.

Referring to the accompanying drawings in which similar reference characters refer to corersponding parts and elements throughout the several figures thereof:

Fig. 1 is a view in side elevation of a milling machine of the horizontal spindle type embodying a horizontal cutter spindle and drive therefor of my invention, the cutter spindle and range gears mounted thereon being shown in dotted lines.

Fig. 2 is a view in side elevation of the spindle unit including the horizontal spindle and the range gears directly mounted thereon at the operating end or nose of the spindle.

Figure 3:
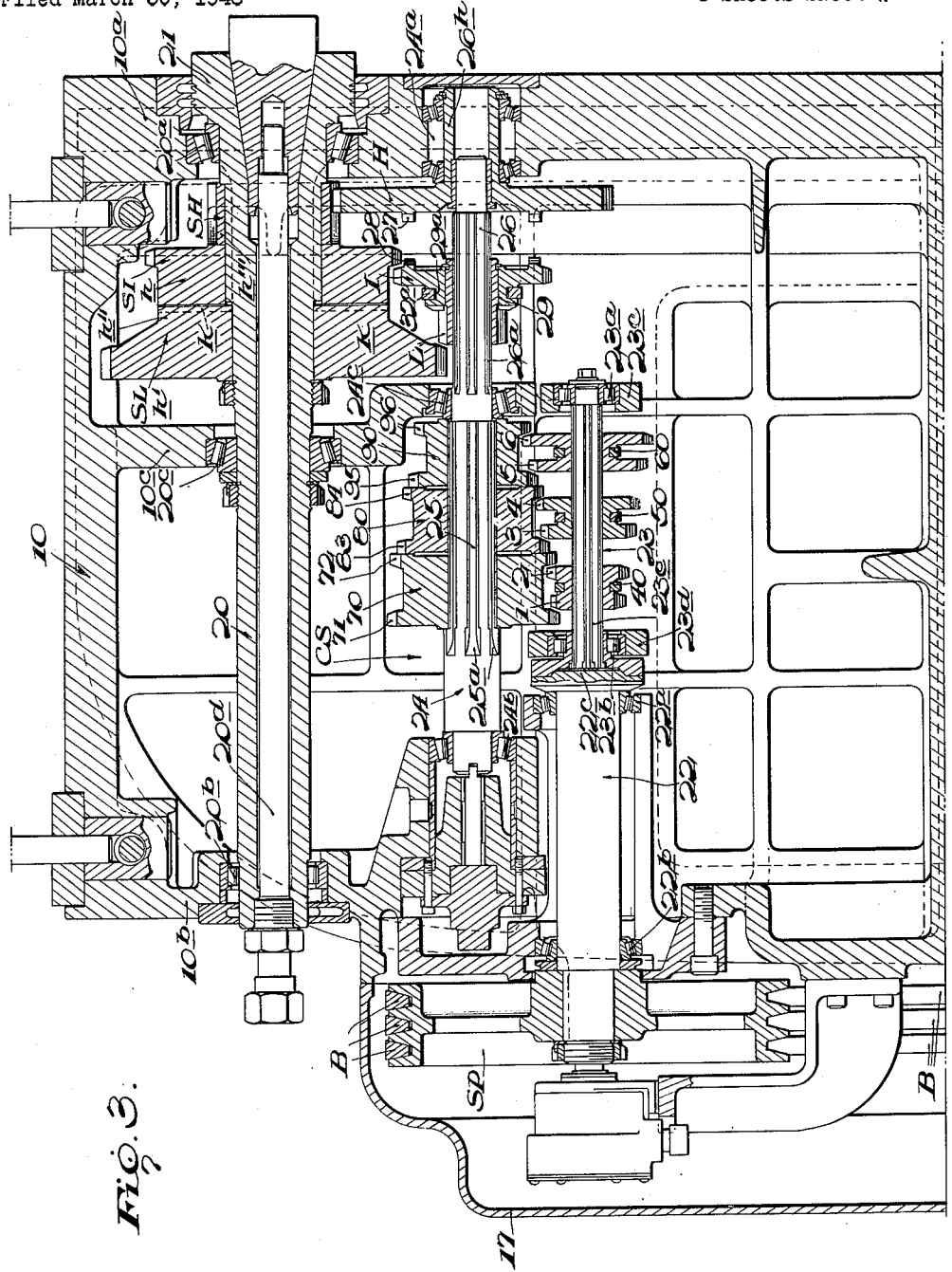
Fig. 3 is a view in vertical section through the upper portion of the column of the milling machine of Fig. 1, showing the horizontal spindle and spindle drive transmission, including the sets of range gears and the change speed gear unit, and also showing a portion of the motor driven belt and pulley power transmission to the spindle drive.

An application of a horizontal cutter spindle and a change speed drive therefor of the invention to a milling machine of a relatively high powered, heavy duty, knee and column type, is illustrated in the accompanying drawings to serve as an example for purposes of explaining the principles and features of the invention. But, it is to be here noted that the expression and embodiment of a cutter spindle and drive here shown is primarily by way of example and not in all respects of limitation, as the invention is not restricted to application to the particular type of horizontal spindle column and knee milling machine of the illustrated example, and further, various features of the cutter spindle and drive are adapted for application to machine tool spindles generally.

The milling machine of the example, referring to Fig. 1, embodies the main frame structure in the form of a vertical column 10, having mounted at the forward side thereof the vertically movable knee 11, on which is mounted the saddle 12 for transverse or in and out movements on the knee relative to the machine, and the work table 14 mounted on the saddle for movements longitudinally of the machine along a path perpendicular to the path of movements of the saddle 12. Such column, knee, saddle and work table arrangement may be considered to be more or less conventional for purposes of this example, and to include any usual power and/or manual operating mechanism for effecting movements of such elements.

The column structure 10 at the upper end thereof is, in this particular form of horizontal spindle type of milling machine, provided with a horizontally disposed head or ram 15 adjustably slidably mounted thereon with the forward length of the ram projected to extend over and above the work table 14 therebelow, as will be understood by those familiar with this general type of milling machine.

A spindle 20, referring now to Fig. 3 in particular, for driving any suitable rotary tool such as a milling cutter, is mounted in the upper end portion of column structure 10 below the ram 15, in horizontal position extending through the column from front to rear of the machine, with the forward operating end or nose 21 located in and accessible through the forward wall 10a of column 10 above work table 14. Spindle 20 is mounted and journalled at its forward end in an annular, roller bearing assembly 20a of the combined radial and thrust type, with this bearing mounted in the forward wall 10a immediately adjacent the rear or inner side of the spindle nose 21. The rear end of spindle 20 extends through the rear vertical wall 10b of column structure 10 and mounts and is journaled in a suitable annular roller bearing assembly 20b of the radial type which is positioned and mounted in such rear wall 10b. An annular, roller bearing assembly 20c of the combined radial and thrust type is mounted in a vertically disposed transverse wall or partition 10c within and forming a portion of column structure 10, at a location spaced a distance inwardly of spindle 20 from the forward end bearing 20a, and this bearing assembly 20c so mounted, receives and journals therein the spindle 20, as will be clear by reference to Fig. 3 of the drawings. Bearing assemblies 20a and 20c are mounted and arranged relative to the spindle 20 to care for thrust forces acting along the spindle in opposite directions axially thereof.

The cutter spindle 20 may be of the usual type having an axial bore therethrough from end to end thereof, in which there is mounted a draw bar 20d extending therethrough for adjustment from the rear end thereof to releasably secure a cutting tool or arbor in mounted position in the spindle nose 21, as will be readily understood by those skilled in this art.

The spindle 20 is driven from a motor M mounted within the lower end portion of the column structure 10, as shown in Fig. 1. Motor M includes a motor shaft m and is mounted on the column structure in position with the shaft m thereof parallel with the horizontal cutter spindle 20 located at the upper end portion of column 10. Motor M drives a pulley MP mounted on motor shaft m, of the multiple V-belt type. This pulley MP in turn drives a pulley SP which is mounted in position on column 10 above pulley MP through a multiple V-belt system B connecting these two pulleys in driving relation. The belt drive transmission comprising pulleys MP and SP with the belt system B, may, as in the example hereof, be mounted and positioned at the exterior of the rear wall 10b of column structure 10 and be enclosed in a suitable removable casing 17 (see Figs. 1 and 3). The motor M is preferably of the reversible type so that the spindle drive of the invention may be operated to rotate the spindle 20 in either direction. Obviously, if found desirable or expedient, other means for operating the drive to rotate the spindle in either direction could be employed, such for example, as the interposition of a suitable reversing gear or the like unit (not shown) between the motor and the spindle drive organization.

Pulley SP is mounted on the rear end of a drive shaft 22. This drive shaft 22 is mounted in the column 10 in horizontal position spaced below cutter spindle 20. Shaft 22 is mounted in position parallel with the cutter spindle 20 and is located relative to the spindle so that its axis of rotation is disposed in the vertical plane passing through the spindle axis of rotation. The drive shaft 22 is journaled at the forward and rear ends thereof in roller bearing assemblies 22a and 22b respectively. The forward inner end of drive shaft 22 is connected by a suitable coupling unit 22c into driving relation with the rear end of the horizontally disposed power input or driving shaft 23 of a change speed gear mechanism or unit CS, through and from which unit the spindle 20 may be driven at a selected speed within the speed range of the unit and associated drive between that unit and the spindle. Power input shaft 23 of unit CS is mounted in axial continuation of drive shaft 22 and hence, is disposed parallel with cutter spindle 20 with its axis of rotation in the vertical plane passing through the axis of rotation of the spindle.

A counter shaft 24 is mounted in horizontal position within the column structure 10, between and parallel with driving shaft 23 of the change speed gear unit CS and the cutter spindle 20 thereabove. Counter shaft 24 so mounted is located relative to shaft 23 and the cutter spindle 20, so that its axis of rotation lies in the vertical plane which passes through the axes of rotation of shaft 23 and spindle 20. The counter shaft 24 extends through and across the column structure 10 and is mounted and rotatably journaled at its forward end in the hollow hub 26h of the relatively large diameter, high speed range gear H. Gear H is rotatably mounted and journaled by a forward extension of the hub 26h thereof, in an annular roller bearing assembly 24a mounted in the forward wall 10a of the column structure 10. Such mounting of the forward end of counter shaft 24 provides for rotation of the high speed range gear H and the counter shaft independently of each other about the common axis provided by the shaft. The rear end of counter shaft 24 is mounted and rotatably journaled in an annular roller bearing assembly 24b mounted in fixed structure within the column 10 supported from the rear wall 10b thereof. The counter shaft thus extends through and across column 10 from the forward wall 10a to the rear wall 10b thereof, above driving shaft 23 of change speed gear unit CS, and that length or section of counter shaft 24 which is opposite and above driving shaft 23, provides the driven shaft 25. A bearing 24c is provided for the counter shaft 24 intermediate the length of the shaft and, in this instance, such bearing is constituted by an annular roller bearing assembly mounted in fixed structure provided by column 10 and being located at the forward end of driving shaft section 25 of the counter shaft above the forward end bearing 23c for the driving shaft 23 of unit CS. The portion or section of the counter shaft 24 which extends from the forward end of driven shaft section 25 in the bearing 24c to the high speed range gear H, provides a power take-off shaft section 26 from which power is transmitted to the cutter spindle 20 through the range gears to be hereinafter described.

The cutter spindle drive is, in this instance, of the dual directional type, that is, it may be operated to rotate the cutter spindle 20 in either direction. By the mounting and arrangement of the spindle 20, counter shaft 24 and driving shaft 22—23 in parallelism with their axes of rotation and the axes of their supporting bearings disposed in the same vertical plane, the possibility of any cramping effect or pinch bar action being developed when the shafts of the drive are operated for rotating spindle 20 in one of its directions of rotation, is reduced to a minimum.

The power take-off shaft section 26 of the counter shaft 24 is formed with a series of splines 26a thereon between the change speed gear unit CS and the high speed range gear H at the forward end of the shaft. A gear cluster or couplet unit 29 comprising the low speed range gear L and the intermediate speed range gear I, is mounted on and splined to power take-off shaft 26 in position with the intermediate range gear I thereof located on the shaft between the high speed range gear H and the low speed range gear L. Low speed range gear L is in the form of a relatively small diameter pinion gear, while intermediate speed range gear I is of a diameter greater than the diameter of gear L but less than the diameter of the high speed range gear H. This gear cluster 29 is slidable as a unit on the take-off shaft section 26 between a position with the intermediate range gear I adjacent and in engaged driving relation with the high speed range gear H, and a position with the low speed range gear L located at the rear end of shaft section 26 adjacent to change speed gear unit CS and with the intermediate range gear I moved rearwardly on the shaft to a position disengaged from the high speed range gear H.

The high speed range gear H at the inner side thereof is provided with an annular series of clutch teeth 27 therearound projecting rearwardly therefrom concentric with the axis of the gear, and the intermediate range gear I is provided at the outer side thereof facing gear H with an annular series of clutch teeth 28 positioned thereon and therearound for clutching engagement with the teeth 27 of the high speed range gear H when the gear cluster unit 29 is moved forwardly on shaft section 26 to position range gear I for engaging the clutch teeth 28 thereof with the clutch teeth 27 of gear H. Thus, in the engaged position of the high speed range gear H with the intermediate speed range gear I of the slidable gear cluster unit 29, the high speed range gear H will be driven by and from the shaft section 26 and the intermediate range gear I. The gear cluster unit 29 is provided with an annular groove 29a therearound between range gears I and L thereof, for slidably receiving a suitable shifting fork for selectively shifting the gear cluster unit to and between its several operative positions on shaft section 26, as will be explained hereinafter.

In accordance with an important feature of my invention, the cutter spindle 20 directly mounts thereon a series of at least three (3) speed range gears, namely, a high speed range gear SH of the helical or spiral type, an intermediate speed range gear SI, and a low speed range or so-called bull gear SL, gears SI and SL in this instance being of the spur type. The high speed range gear SH on spindle 20 is of considerably smaller diameter than, and is adapted to be selectively engaged by, the high speed range gear H on shaft section 26, range gear H being of the helical or spiral type for operative meshing with gear SH. The gears H and SH thus form a set or pair of gears for driving spindle 20 from counter shaft 24 in the high speed range. Intermediate range gear SI on spindle 20 is of greater diameter than the diameter of gear SH, and is adapted to be engaged by the intermediate range gear I of the gear cluster unit 29 on shaft section 26. Intermediate range gear SI is in this instance of greater diameter than the diameter of gear I to be engaged therewith. The spindle mounted gear SI and the gear I on shaft 26 thus provide the set or pair of gears for driving spindle 20 from counter shaft 24 in the intermediate speed range, while low speed range gear SL on spindle 20 is adapted to be selectively engaged with the range gear L on the movable gear cluster unit on shaft section 26 to thus provide a set or pair of gears for driving spindle 20 from counter shaft 24 in the low speed range of operations of the spindle.

The helical or spiral, relatively small diameter high speed range gear SH of the spindle mounted range gears, is located on and keyed to the spindle 20 at the inner end of the spindle nose 21 immediately adjacent the inner side of the forward wall 10a of the machine column structure 10, this range gear SH being of general pinion form.

The spindle mounted intermediate speed range gear SI has a relatively greater diameter than the diameter of the pinion gear SH, and is of substantial thickness to provide a large diameter, solid material hub portion h, the diameter of which is but slightly less than the operating, toothed portion proper of the gear. Gear SI is keyed on spindle 20 with the forward side thereof abutting the adjacent rear side of range gear SH and with the gear forming toothed portion thereof adjacent gear SH, so that the hub portion h thereof is disposed at the inner side of the gear opposite the forwardly mounted gear SH. Spindle mounted intermediate range gear SI, so constructed, thus provides a relatively heavy, large diameter weight mass immediately adjacent the forwardly mounted range gear SH at the operating end or nose 21 of the spindle 20.

The spindle mounted, low speed range gear SL, the so-called bull gear, is of greater diameter than the diameter of the intermediate range gear SI, and is formed of substantial thickness to provide a large diameter, solid material hub portion $h'$ of considerable thickness or width relative to the toothed portion of the gear with the rearward portion $h''$ thereof formed of a diameter substantially equal to the diameter of hub $h$ of the range gear SI. Hub $h'$ of gear SL may be sloped or inclined radially outwardly from the portion $h''$ thereof to a location around and adjacent the inner side of the toothed portion of the gear. By this design and construction, the spindle mounted low speed range gear SL provides a relatively heavy, large diameter weight mass on the spindle 20 adjacent the nose 21 of the spindle.

The spindle mounted, relatively small diameter, helical high speed range gear SH is of substantial width and, in this example, is toothed completely across its width. This gear SH also has substantial depth or thickness and is formed to provide a solid material hub portion $h'''$ which, in this instance, extends through the full width of the gear (see Fig. 3). Thus, the high speed range gear SH presents a relatively heavy weight mass.

The high speed rang gear SH is mounted on the spindle in immediate proximity and juxtaposition to the spindle nose 21. The intermediate speed range gear SI is mounted on the spindle immediately adjacent and juxtaposed to high speed gear SH. The large diameter low speed range gear SL is mounted on the spindle 20 immediately adjacent and in juxtaposition to the intermediate range gear SL, so that the forward side of gear SL is substantially against and abuts the facing inner side of the adjacent intermediate speed range gear SI. Hence the relatively large weight masses provided by the gears SH, SI, and SL with their hubs $h$, $h'$ and $h'''$, respectively, are combined into what in effect is a single structure of relatively large diameter providing a single weight mass or fly-wheel adjacent and in immediate proximity to the nose 21 of the spindle.

In accordance with a further feature of my invention, the large diameter, low speed range gear SL with its high weight mass is mounted on the spindle 20 relative to the intermediate range gear SI in such a manner that the torque transmitted by gear SL to the spindle will be applied at a location spaced forwardly along the spindle and in relatively close proximity to the operating end or nose 21 from the location on the range gear SL at which gear SL receives the torque from the low speed range gear L on the shaft section 26 when the gears L and SL are in operative driving engagement.

In the present example, such result is obtained by mounting the low speed range gear SL on the spindle 20 immediately adjacent the inner side of the intermediate speed range gear SI with the forward side of gear SL substantially against or abutting the facing inner side of the adjacent gear SI. The relatively large diameter, low speed range gear SL in accordance with this feature of my invention, is not directly connected to the spindle 20 but is directly connected to the adjacent intermediate range gear SI by keying, or otherwise suitably connecting the hub portion $h''$ of gear SL to the adjacent hub portion $h$ of the gear SI. For instance, diametrically opposite, radially disposed keys $k$ may be formed on hub portion $h''$ of gear SL and seated and secured in facing keyways or slots formed in the adjacent abutting surface of the hub portion $h$ of the intermediate range gear SI. In this manner the torque of the low speed range gear SL is transmitted to the intermediate range gear SI at a location spaced forwardly along spindle 20 from the plane of the toothed portion of gear SL to which the driving torque is applied from the range gear L on shaft section 26. Hence, the torque from range gear SL is applied to the spindle 20 at a location substantially closer to the operating end or nose 21 of the spindle, than the location on spindle 20 at which torque is transmitted to gear SL from gear L.

The three (3) range gears SL, SI and SH are directly mounted on the horizontal spindle 20 immediately adjacent and in proximity to the nose 21 of the spindle and the front bearing 20a therefor, with the gear SH at the inner side of bearing 20a immediately adjacent thereto, gear SI immediately adjacent and in effect abutting gear SH at the inner side thereof, and the gear SL immediately adjacent, abutting and directly connected to the inner side of gear SI. By providing each of the intermediate and low speed solid material hubs $h$ and $h'$, respectively, and the relatively wide helical high speed range gear with the wide solid material hub $h'''$, these gears together provide a substantial weight mass which is located in close proximity to the nose 21 of and the forward bearing 20a for, the spindle 20 with the result that a very effective flywheel effect is developed acting at the operating end of the spindle in close proximity to the spindle nose 21.

Helical range gear H on shaft section 26 is mounted on the forward end of that shaft for rotation on and independently of the shaft and is in constant mesh with the helical range gear SH which is mounted directly on and keyed to the spindle 20 for rotation with the spindle. These constantly engaged gears H and SH comprise the set of gears for rotation of spindle 20 in the high speed range. The gear cluster 29 which includes range gear I is splined to and slidable axially of shaft section 26, and range gear I is adapted to be engaged with range gear SI directly mounted on spindle 20 to provide the set of range gears for driving the spindle 20 in the intermediate speed range. Range gear L of gear cluster 29 is adapted to be engaged with the low speed range or bull gear SL mounted on spindle 20 and connected into driving relation therewith through the spindle mounted gear SI. Range gears L and SL provide the set of gears for driving spindle 20 in the low speed range.

The gear cluster unit 29 slidably mounted on shaft 26 is so designed that when it is moved axially inwardly on the shaft to position engaging range gear L thereof with the spindle mounted range gear SL, range gear I is disengaged from spindle mounted range gear SI, as well as being out of engagement with high speed range gear H on the shaft section 26. The spindle 20 will then be driven from shaft section 26 through the engaged range gears L and SL, in the low speed range.

Attention is here directed to the fact that the spindle mounted low speed range gear or so called bull gear SL is mounted and positioned on the spindle as the inner or rearmost gear of the series of spindle mounted range gears, and that the low speed range gear or so called bull pinion L, of the shiftable gear cluster 29 on the power take-off shaft 26, is when moved inwardly of that shaft to position engaged with the spindle mounted bull gear SL, located in immediate proximity to the bearing 24c of the counter-shaft 24 which is located at the inner end of shaft section 26. This arrangement substantially eliminates or reduces to a minimum any lateral deflection of the shaft 26 as well as reducing to a minimum any torsional deflection of this shaft under the loads imposed thereon with the low speed range gears L and SL in engagement for driving the spindle 20 from shaft 26.

When gear cluster unit 29 is moved axially forwardly on shaft section 26 to a position engaging range gear I thereof with the spindle mounted range gear SI, then gear L of unit 29 is in position disengaged from the spindle mounted range gear SL while the clutch teeth 28 of the gear I remain in position out of engagement with the clutch teeth 27 of high speed range gear H. When gear cluster unit 29 is moved axially in a forward direction on shaft section 26 into a position with the clutch teeth 28 on range gear I engaged with clutch teeth 27 of the high speed range gear H to place the latter in driving connection with shaft 26, then the range gears I and L of unit 29 are disengaged from the spindle mounted range gears SI and SL, respectively. Except when engaged in driving connection with gear I of unit 29, the high speed range gear H on shaft section 26 is idly rotated on and independently of shaft section 26 by the rotation of the spindle mounted range gear SH with which range gear H is in constant mesh.

A manually operable speed range selector control is provided for actuating the range gear cluster unit 29 on shaft section 26 to selectively set up any desired one of the three (3) sets of range gears L and SL, I and SI, or H and SH, respectively, so that the cutter spindle 20 will be driven from shaft section 26 in the selected speed range. Any suitable or desired mechanical arrangement for effecting selective setting up into operative position, of any one of the three (3) sets of range gears may be provided. In the present example, I happen to show such a control which embodies a hand crank 30, referring now to Figs. 1 and 4, located at one side of the column structure 10 on the exterior thereof at the upper side of the outer face or dial mounting plate D of the change speed unit CS on which the manual control for such change speed unit is also mounted.

Figure 4:
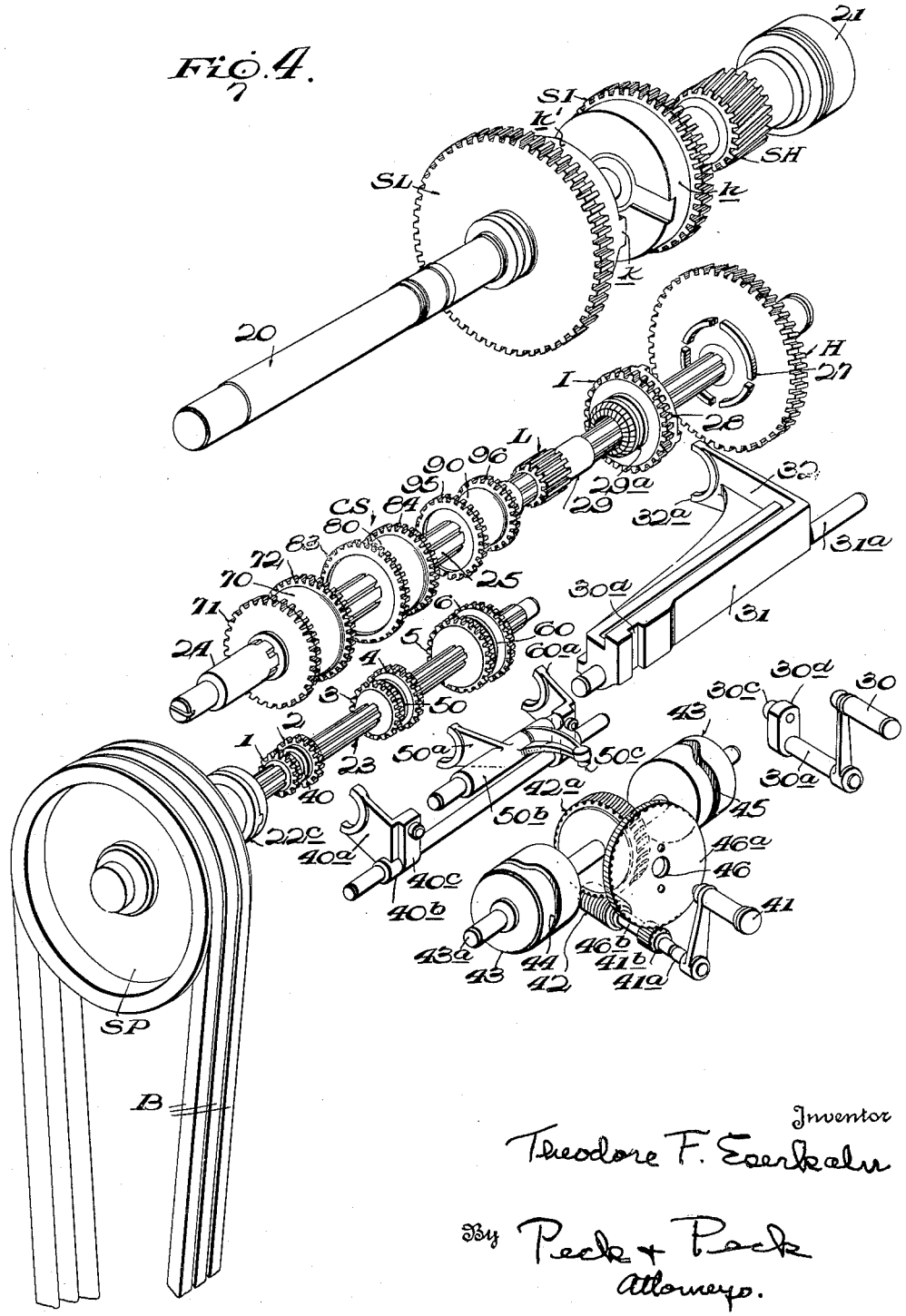
Fig. 4 is a perspective view of the horizontal cutter spindle, and the change speed spindle drive, including the sets of range gears and change speed gearing unit with the manually controlled selector mechanism therefor, all of the elements being separated or pulled apart but maintained in their general positions relative to each other.

A range selector control mechanism for operation by such hand crank 30, is more or less schematically illustrated in Fig. 4 primarily to generally indicate a possible form of such a mechanism by which the slidable gear cluster unit 29 may be selectively actuated to position for setting up the range gears for operation of spindle 20 in a desired speed range. For instance, the hand crank 30 may be mounted on the outer end of a generally horizontally disposed shaft 30a extending into column structure 10. Shaft 30a is suitably mounted and journaled for rotation in either direction by hand crank 30 and at the inner end thereof is provided with a crank arm 30d. A slide member 31 may be slidably mounted on a rod or guide 31a fixed in horizontally disposed position parallel with and in the general horizontal plane of counter shaft 24. The rod or guide 31a and slide 31 mounted thereon are positioned forwardly and generally opposite and along the section 26 of counter shaft 24 on which the range gear cluster 29 is slidably mounted. A shifter fork 32 is mounted in fixed position on slide 31 for movement with the slide as a unit, and extends inwardly from one end thereof to the range gear cluster unit 29 with the inner forked end 32a of fork member 32 slidably received and engaged in the annular fork groove 29a of gear cluster unit 29 (see Fig. 3). Thus, movements of slide 31 in either direction along guide 31a in a straight line parallel with the axis of shaft section 26 will slide gear cluster 29 on shaft section 26 in a corresponding direction. Suitable operating connections are provided between the crank arm 30d and the adjacent end of slide 31, such connections including in the example hereof, a roller 30c on crank arm 30d engaged in a vertically disposed groove 30d in the slide 31, as generally indicated in Fig. 4.

In this instance, rotation of the range speed selector hand crank 30 to the right or clockwise will move slide 31 and fork 32 to the right to slide gear cluster unit 29 outwardly along shaft section 26 until the clutch teeth 28 of the intermediate range gear I are engaged with clutch teeth 27 of the high speed range gear H, thus engaging these gears in driving relation so that high speed range gear H is then driven by shaft section 26 and drives the spindle mounted high speed range gear SH with which it is in constant mesh to thereby drive cutter spindle 20 in the high speed range.

Hand crank 30 is swung to its limit of movement to the left or counter clockwise in order to set up the low speed range gears L and SL for driving spindle 20 from shaft section 26 in the low speed range. In such low speed range selection position of hand crank 30, the slide 31 is moved thereby to the left to position in which shifter fork 32 has moved gear cluster 29 on shaft 26 to position with the low speed range gear L of the cluster unit engaged with the spindle mounted low speed range gear SL.

The intermediate speed range selection position of the hand crank 30 is at a location intermediate the extreme positions thereof swung to the right for high speed range selection and swung to the left for low speed range selection, respectively, as referred to hereinabove.

From either high or low speed range selection position, hand crank 30 is swing to an intermediate position such that slide 31 and its fork member 32 will have moved gear cluster unit 29 to a position in which the intermediate range gear I of the cluster unit will be engaged with the spindle mounted intermediate range gear SI. In this position, spindle 20 will be driven in the intermediate speed range from the shaft section 26.

The arrangement of the range gear cluster 29 on shaft section 26 relative to the high speed range gear H on that shaft section and to the range gears SL and SI mounted directly on the spindle 20, is such that gear unit 29 in shifting between high, intermediate, and low speed range selection positions, passes through a neutral position with the gears of all three (3) sets of range gears disengaged and inactive. In the normal operation of the sets of range gears, this neutral position is a transient one. However, if for some reason the operator should desire to turn the cutter spindle by hand, he could do so by shifting gear cluster 29 to and leaving it in such neutral position. This normally transient neutral position in which the cutter spindle 20 is completely disengaged from driving connection with counter shaft 24 and shaft section 26 thereof, is shown in Fig. 3 of the drawings.

The face or dial plate D of the change speed unit CS may be provided with suitable markings indicating the "low," "intermediate" and "high" speed range selection positions of the hand crank 30 thereon.

The change speed gear unit CS is interposed in driving association between the motor driven or power shaft 22 and the counter shaft 24 for transmitting driving power from the shaft 22 through a selected speed step of unit CS and a selected set of the range gears, to the cutter spindle 20. In this example, this change speed gear unit CS includes the driving shaft 23 which is mounted and journaled at its opposite ends in the bearing assemblies 23a and 23b, mounted in the spaced bolsters or bearing supports 23c and 23d, respectively, extending inwardly from the inner side of the face plate D of the unit. Driving shaft 23 is axially aligned with power shaft 22 and is connected in driving relation with shaft 22 by the shaft coupling 22c.

The driving shaft 23 is formed with a series of splines 23e thereon and mounts a series of three (3) primary gear couplets 40, 50 and 60, each of which is splined to the shaft and is independently slidable axially thereon in either direction. Gear couplet 40 is positioned on shaft 23 adjacent that end of the shaft coupled with drive shaft 22, that is the left hand end when facing Figs. 3 and 4; and includes the spaced primary gears 1 and 2 integral with the couplet. Gear couplet 50 is mounted on the shaft 23 adjacent couplet 40 and includes the spaced primary gears 3 and 4. Gear couplet 60 is mounted on shaft 23 located adjacent couplet 50 and between that couplet and the adjacent right hand end of the shaft. The gear couplet 60 includes the spaced primary gears 5 and 6. Gear 1 of couplet 40 has the smallest diameter of any one of the gears of the series of couplet gears and is located adjacent the left hand or inner end of shaft 23. This gear 1 of couplet 40 provides for the lowest speed step of the change speed mechanism, as will be hereinafter explained. Gear 2 of couplet 40 is of increased diameter relative to the diameter of gear 1 and provides the next higher speed step of the change speed unit CS. Gear 3 of couplet 50 is of increased diameter relative to the diameter of the adjacent gear 2 of couplet 40, and each of the succeeding gears 4, 5 and 6, is of increased diameter relative to the diameter of the next adjacent preceding gear respectively, of such series of primary gears, passing from left to right along shaft 23 when facing Figs. 3 and 4. The gear 6 of couplet 60 provides for the highest speed step of the change speed unit. Thus, primary gear couplets 40, 50 and 60 together provide a series of six (6) gears defining six (6) speed steps which provide for progressively increased rates of speed from the low speed step defined by gear 1 of couplet 40 to the high speed step defined by gear 6 of couplet 60.

The counter shaft 24 is positioned above and extends across unit CS, parallel with the driving shaft 23 of the unit. The section of the counter shaft directly above driving shaft 23 provides the driven shaft 25 for the unit. Driven shaft section 25 is provided with the splines 25a thereon.

Three (3) secondary or driven drum gears 70, 80 and 90, adapted to be selectively driven from the primary gear couplets 40, 50 and 60, respectively, are mounted and splined on driven shaft 25 for rotating the shaft. These drum gears are mounted and secured on shaft 25 in positions fixed against movements axially of the shaft.

Drum gear 70 is mounted at the left hand end of shaft 25 in position opposite and spaced above gear couplet 40 and includes the spaced spur gears 71 and 72 concentric with the shaft axis. Gear 71 is of relatively large diameter compared to gear 1 of primary couplet 40, while gear 72 has a smaller diameter than the diameter of the gear 71.

Drum gear 80 is mounted on driven shaft 25 adjacent and substantially abutting drum gear 70 in position opposite and above primary gear couplet 50. Drum gear 80 includes the spaced spur gears 83 and 84 concentric with the axis of shaft 25, with gear 83 having a smaller diameter than the diameter of the adjacent gear 72 and gear 84 having a decreased diameter relative to the diameter of gear 83.

Drum gear 90 is mounted on driven shaft 25 adjacent and substantially abutting drum gear 80 in position above and opposite primary gear couplet 60. Drum gear 90 includes the spaced spur gears 95 and 96 thereon concentric with the axis of the driven shaft 25, with gear 95 being of smaller diameter than the diameter of the adjacent gear 84 of drum gear 80, and gear 96 being of smaller diameter than the diameter of the gear 95.

Thus, the spur gears of the secondary or driven drum gear units 70, 80 and 90, progressively decrease in diameter from the rear end of driven shaft 25 forwardly therealong to the forward end of that shaft, while the gears of primary gear couplets 40, 50, and 60, which are mounted on the driving shaft 23, progressively increase in inverse order relative to units 70, 80 and 90, that is, progressively increase in diameter from the forward end of shaft 23 rearwardly therealong to the rear end of that shaft.

The spacing of the pairs of gears, respectively, of the primary gear couplets 40, 50 and 60, and the diameters of these gears relative to the spacing and the diameters of the spur gears of the secondary gear units 70, 80 and 90, which are respectively opposite the primary gear couplets, is such that the gears 1 and 2 of couplet 40 extend between gears 71 and 72 of drum gear 75; the gears 3 and 4 of couplet 50 extend between gears 83 and 84 of drum gear 80; and the gears 5 and 6 of gear couplet 60 extend between gears 95 and 96 of drum gear 90, when each of the gear couplets is in neutral or disengaged position relative to each of the drum gears respectively opposite and associated therewith.

Primary gear couplet 40 is movable axially on shaft 23 between a position with gear 1 thereof engaged with gear 71 of secondary gear unit 70 for the lowest speed step and a position with the gear 2 of the couplet engaged with gear 72 of gear unit 70 for the next highest speed step; primary gear couplet 50 is movable between position with gear 3 thereof engaged with gear 83 of secondary gear unit 80 for the third highest speed step and a position with gear 4 thereof engaged with gear 84 of unit 80 for the next highest speed step; and primary gear couplet 60 is movable between a position with gear 5 thereof engaged with gear 95 of secondary gear unit 90 for the fifth highest speed step and a position with gear 6 thereof engaged with gear 96 of unit 90 for the highest speed step of the six (6) speed steps of the change speed unit CS.

Each of the primary gear couplets 40, 50 and 60, respectively, is movable to a neutral position, as shown in Fig. 3, in which the gears of the couplet are disengaged from the gears of the respective secondary gear units 70, 80 or 90 to be driven thereby, so that, in such neutral position the primary gear couplet is completely disconnected from driving relation with its secondary or driven gear unit. Thus, by selective positioning of the gear couplets 40, 50 and 60, relative to the gear units 70, 80 and 90, the driving shaft 23 may be connected in driving relation with shaft 25 for driving the shaft and the range gears L, I and H, on section 26 of that shaft, at any selected one of six (6) rates of speed defined and provided by gear sets 1—71, 2—72, 3—83, 4—84, 5—95 and 6—96, respectively. Attention is here directed to the fact that in each of the selected speed steps for which change speed gear unit CS is adjusted, the engagement of only two (2) gears is required to drive counter shaft 24 and the range gears L, I and H on section 26 thereof, from the driving shaft 23 at the selected rate of speed. The primary or driving gear couplets 40, 50 and 60, and the secondary or driven gear units 70, 80 and 90, respectively, thus form gear trains of the simplest compound gear train form.

It is to be noted in connection with the above design and arrangement that the low speed primary gear couplet 40 is located on driving shaft 23 adjacent the rear end thereof and in immediate proximity to the rear bearing 23d of that shaft. Hence, when primary gear couplet 40 is shifted rearwardly on shaft 23 to engage gears 1 and 71 for the lowest speed step of the unit, gear 1 engages with gear 71 in driving relation therewith at a location immediately adjacent the forward side of the rear bearing 23b. In this manner, lateral and torsional deflections of shaft 23 under low speed step loads are maintained at a minimum.

Thus, in accordance with the invention, the change speed unit is formed of simple compound gear trains constituted by a set of two gears for each step, namely, a driving gear and a driven gear, so that it is possible to attain for the secondary or driven gear of each set, a maximum diameter. With the secondary or driven gears of maximum diameter and, as in the example hereof, provided by gear units of drum form, preferably of solid material, having substantial width to provide the necessary spacing between the gears of each unit, the secondary gear units 70, 80 and 90 on shaft 25, thus provide a total weight mass which will develop a substantial fly-wheel effect acting on shaft 25.

As the sets of range gears L—SL; I—SI; and H—SH, are each contituted by the simplest compound gear train and have the driving gears L, I and H thereof directly driven from the driven shaft 25 of the change speed unit, it follows that a system of but two (2) shafts is required between the motor driven transmission and the cutter spindle 20, and further that any step of the full range of steps, such as the eighteen (18) speed step range of this particular example, may be selectively set up by the use of but two (2) shifts, namely, a primary shift of the gear couplets 40, 50 and 60 on shaft 23 of the change speed unit, and a range shift of range gears S, I and H on the shaft 26. In this manner, any necessity for a secondary shift is eliminated.

A manually operable control is provided for selectively operating the change speed unit CS to set up any one of the six (6) speed steps at which counter shaft 24 may be driven from the driving shaft 23, such a control being more or less schematically illustrated in Fig. 4 of the drawings. In this example, the control includes a hand crank 41 which is positioned at the exterior of the face or dial mounting plate D of change speed unit CS, being located on plate D in position below hand crank 30 of the speed range selector control (see Fig. 1). Hand crank 41 is fixed on the outer end of a horizontally disposed shaft 41a which extends into unit CS and which carries at its inner end a worm 42. A barrel cam 43 is mounted on a horizontally disposed shaft 43a extending above and across shaft 41a with its axis perpendicular to the axis of the latter shaft. A worm gear 42a is provided on and around drum cam 43 intermediate the length thereof and concentric with the axis of shaft 43a. Worm 42 of shaft 41a is meshed with worm gear 42a at the underside thereof for rotating shaft 43a by rotation of hand crank 41. The barrel cam 43 is provided with a cam groove 44 formed therearound at the left hand side of worm gear 42a when facing Fig. 4, and with another cam groove 45 formed therearound to the right of the worm gear.

Shifter forks 40a, 50a and 60a are provided in engagement with the gear couplets 40, 50 and 60, respectively, for operation to selectively shift the gear couplets. Shifter fork 40a is operated by rotation of barrel cam 43 through a cam follower 40b engaged in cam groove 44, shifter fork 40a being mounted on a suitable slide 40c for movement by follower 40b in opposite directions along a straight line path parallel with the axis of driven shaft 23. Shifter forks 50a and 60a are fixed on a slide 50b for movement with such slide as a unit in either direction along a straight line path parallel with the axis of the driven shaft 23. Slide 50b is actuated to move shifter forks 50a and 60a in either direction along the straight line path to simultaneously shift the gear couplets 50 and 60 in either direction on driven shaft 25 by a cam follower 50c which is engaged in cam groove 45 of the barrel cam 43.

With the change speed gear unit CS set by the speed selector control for driving shaft 25 in the low speed step, gear couplet 40 is in position with the gear 1 thereof engaged with gear 71 of the drum gear 70, while the remaining gears 2, 3, 4, 5 and 6 of the gear couplets are all maintained in disengaged neutral position.

With the change speed unit set in the foregoing low speed selection position, then by rotation of hand crank 41 in the proper direction, barrel cam 43 and cam groove 44 thereof are rotated to cause movement of shifter fork 40a to shift gear couplet 40 in a direction to disengage gear 1 thereof and to engage gear 2 with gear 72 of drum gear 70 to thus select and set up the next highest speed step. During such movement of barrel cam 43, cam groove 45 thereof maintains gear couplets 50 and 60 in neutral disengaged positions.

Continued rotation of hand crank 41 in the same direction will rotate cam 43 to cause cam groove 44 thereof to effect shifting of gear couplet 40 to neutral position completely disengaged from drum cam 70, while cam groove 45 of cam 43 will thereafter become effective and cause movement of shifter fork 50a to shift gear couplet 50 to engage gear 3 thereof with the gear 83 of drum gear 80 to thus select and set up the next highest speed step. In this selection position, couplet 60 is maintained in neutral, disengaged position.

With the change speed gear unit set for the speed step provided by the engagement of gears 3 and 83, continued rotation of hand crank 41 in the same direction will rotate the barrel cam 43 to cause the cam groove 45 thereof to move shifter forks 50a and 60a in synchronism to shift gear couplets 50 and 60 so as to successively engage the sets of gears 4 and 84, gears 5 and 95, and gears 6 and 96, respectively, to thereby successively set up the respective steps defined and provided by such sets of gears when engaged.

With hand crank 41 in the selection position with the set of gears 6 and 96 in engagement to provide the highest speed step of the change speed unit, rotation of hand crank 41 in the reverse direction, that is, to the left or counterclockwise, will through the medium of the cam grooves 44 and 45, cause progressive movements of the shifter forks 60a, 50a and 40a, respectively, to successively shift gear couplets 60, 50 and 40 so as to progressively engage the sets of gears 5 and 95, 4 and 84, and 3 and 83, 2 and 72, and 1 and 71, to thus successively set up the speed steps defined and provided by each of said sets of gears when engaged. From any selection position between the lowest speed step and the highest speed step, the hand crank 41 may be rotated in either direction to a desired speed selection position so as to cause the shifter mechanism to engage and set up the set of gears for the selected speed step.

The design and construction of the change speed unit CS with its selectively shiftable driving gear couplets 40, 50 and 60 and gear units 70, 80 and 90 selectively driven therefrom for driving the counter shaft 24 and its range gears L, I and H, is such that the engagement of only two (2) gears of the change speed unit CS is required for each speed step selected and set up.

A speed step selector dial DS is mounted on the exterior of dial plate D on the outer end of stub shaft 46 positioned above and parallel with hand crank actuated shaft 41a. The inner end of stub shaft 46 mounts a relatively large diameter spur gear 46a which is engaged with and driven by a pinion 41b mounted on hand crank rotated shaft 41a. Hence, rotation of shaft 41a causes rotation of gear 46a to rotate stub shaft 46 and the speed step selector dial DS. The face of the speed step selection dial DS may be formed to provide three (3) concentric speed bands thereon, one for each basic speed range, and the face of the dial is further divided into six (6) sectors, one for each speed step provided by the change speed gear unit CS. The portion of each speed band in each sector is provided with a numeral indicating one of the eighteen (18) speed steps of the overall speed range provided by the drive of the example, as generally illustrated in Fig. 1. The gear ratio between pinion 41b on speed selector shaft 41a and the dial plate gear 46a is such that rotation of hand crank 41 to a selection position for any one of the six (6) speed steps of the change speed unit CS will rotate the dial DS to position the sector which bears the speed indicia for that step, at the index or reading point provided for the dial.

In operation of the change speed spindle of the invention in the particular form thereof here presented, the operator through the medium of the speed range selection crank 30, engages and sets up either one of the sets of range gears L—SL, I—SI, or H—SH, for either the low, intermediate or high speed range, respectively, and then by operation of the speed step selector hand crank 41, sets up the desired one (1) of the six (6) speed steps of the change speed unit CS at which it is desired to drive spindle 20 within the selected basic speed range. Thus, the drive of the example provides for eighteen (18) speed steps in the overall speed range within which spindle 20 may be driven. Each speed step selected and set up from the six (6) available speed steps of the change speed unit CS is effected by the engagement of only two (2) gears of the unit for rotating counter shaft 24 from driving shaft 23 at the rate of speed determined by that step. And as each basic speed range selected and set up from the three (3) available basic speed ranges provided by the three (3) sets of range gears is also effected by the engagement of only two (2) range gears for driving the spindle 20 at a rate of speed determined by the selected speed range, it follows that by the design and arrangement of variable or change speed spindle drive of my invention, power is transmitted from the pulley SP of the motor transmission to the cutter spindle 20 through only two (2) active sets of gear contacts. It is to be further noted that by the foregoing arrangement it is possible to utilize only two (2) lines of shafting, namely, 22—23 and 24 (25—26), between the power driven pulley SP and the cutter spindle 20. Further by the mounting and arrangement of such two (2) lines of shafting and of the change speed unit CS associated therewith, relative to the power pulley SP, located at the rear of the column structure 10 and to the nose 21 of spindle 20, located at the forward side of such column structure, it is possible to mount at least three (3) range gears, such as the range gears SH, SI, and SL, directly on the cutter spindle in immediate proximity to the nose 21 of that spindle, and all enclosed and housed within the available space provided by the normal dimensions and shape of the column structure 10.

While in the mechanical expression of a drive embodying my invention adapted to the particular horizontal spindle milling machine of the selected example, I have disclosed a drive providing for three (3) basic speed ranges with three (3) of the range gears of the sets of gears for such ranges directly mounted on the cutter spindle, it is contemplated and included within the scope of my invention to provide a drive for four (4) or more basic speed ranges embodying the direct mounting on the cutter spindle of four (4) or more range gears. In such a drive of the invention providing for more than three (3) basic speed ranges and the mounting of the requisite number of range gears directly on the cutter spindle, such spindle will be driven in accordance with that important feature of my invention by but two (2) active gear contacts between the power drive and the cutter spindle. And similarly, irrespective of whether three (3) or more basic speed ranges are provided, the change speed gear unit may provide for a greater or lesser number of speed steps than the six (6) speed steps provided by the unit CS of this example. As to those features of the invention by which range gears are directly mounted on the spindle in immediate proximity to the nose of the spindle and by which such gears are formed to provide a heavy weight mass for fly wheel effect at the nose end of the spindle, my invention is not limited to the use thereof with a drive which provides three (3) or more spindle mounted range gears but is applicable to a drive having less than three range gears. It should also be noted that the feature of my invention which provides driving of a drive of my invention from a power drive by solely two (2) active gear contacts between that drive and the spindle is intended to be of general adaptability and is not restricted to use in a drive having three (3) or more spindle mounted range gears.

It will also be evident that various other embodiments, mechanical expressions, constructions, combinations, and subcombinations may be resorted to without departing from the broad spirit and scope of my invention, and hence, I do not desire to limit and restrict my invention in all respects to the specific disclosures hereof as illustrated and described herein by way of example, except as may be required by specific intended limitation thereto in any of the appended claims.

What I claim is:

1. In combination, a rotary cutter spindle having an operating nose at one end thereof; a driven shaft opposite and parallel with that portion of said spindle immediately adjacent the operating nose thereof; sets of pairs of range gears defining high, intermediate and low speed ranges, respectively; said high speed set comprising a gear directly mounted on said spindle at the inner end of the spindle nose in immediate proximity thereto, and a gear mounted on said driven shaft; said intermediate speed set comprising a gear mounted directly on said spindle in immediate juxtaposition with the inner side of said spindle mounted high speed gear, and a gear mounted on said driven shaft; said low speed set comprising a gear mounted on said spindle of a large diameter relative to the diameters of said intermediate and high speed spindle mounted gears and being positioned in immediate juxtaposition with the inner side of the spindle mounted intermediate gear, and a pinion gear mounted on said driven shaft having a small diameter relative to said spindle mounted low speed gear; and said spindle mounted intermediate and low speed gears being each formed with an axially extended relatively wide, solid material hub portion adapted to provide a large weight mass in immediate proximity to the nose end of said spindle.

2. In combination, a rotary cutter spindle having at one end thereof an operating nose; a series of at least three (3) range gears mounted directly on said spindle; the outermost of said gears being mounted at the inner end of said operating nose in driving connection with said spindle; the intermediate of said gears being mounted on said spindle in driving connection therewith at the inner side of and in juxtaposition with said outermost gear; the innermost of said gears being mounted on but unconnected directly with said spindle in position thereon at the inner side of and in juxtaposition with said intermediate gear; and said innermost gear being directly connected at the forward side thereof in driving connection with said intermediate gear.

3. In combination, a rotary cutter spindle having an operating nose at one end thereof; a series of at least three (3) range gears mounted on said spindle; the outermost of said gears being connected directly with said spindle and being positioned thereon at the inner end of said operating nose; the intermediate of said gears being directly connected with said spindle in position thereon at the inner side of and in juxtaposition with said outermost gear; said intermediate gear having a relatively large diameter solid material hub portion extended inwardly therefrom on said spindle; the innermost of said gears being unconnected directly with said spindle and being mounted thereon in position at the inner side thereof in juxtaposition with said intermediate gear; said innermost gear having a relatively large diameter solid material hub portion extended forwardly therefrom to said inwardly extended hub portion of said intermediate gear; and the hub portion of said innermost gear being directly connected with the hub portion of said intermediate gear.

4. In combination, a rotary cutter spindle having an operating nose at one end thereof; a series of at least three (3) range gears mounted on said spindle; the outermost of said gears being directly connected with said spindle and being mounted thereon in position at the inner side of said nose; said outermost gear being of relatively small diameter and substantial width and having a solid material hub portion; the intermediate of said gears being of greater diameter than said outermost gear and being directly connected with said spindle in position thereon at the inner side of and in juxtaposition with said outermost gear; said intermediate gear being provided with a relatively large diameter solid material hub portion extended inwardly therefrom; the innermost of said gears being of greater diameter than said intermediate gear and being unconnected directly with said spindle in position thereon at the inner side of and in juxtaposition with said intermediate gear; said innermost gear being provided with a relatively large diameter solid material hub portion extended forwardly therefrom to the inner side of the hub portion of said intermediate gear; and the forward side of the hub portion of said innermost gear being directly connected with the hub portion of said intermediate gear.

THEODORE F. ESERKALN.

REFERENCES CITED

The following references are of record in the file of this patent:

UNITED STATES PATENTS

| Number | Name | Date |
|---|---|---|
| 1,145,236 | Fay | July 6, 1915 |
| 1,233,500 | Parsons | July 17, 1917 |
| 1,416,285 | Griffin | May 16, 1922 |
| 1,490,894 | Einstein | Apr. 15, 1924 |
| 2,115,058 | Armitage | Apr. 26, 1938 |
| 2,192,856 | Henninger | Mar. 5, 1940 |
| 2,239,567 | Henninger | Apr. 22, 1941 |
| 2,303,270 | Grover | Nov. 24, 1942 |
| 2,355,869 | Johnson | Aug. 15, 1944 |
| 2,430,127 | Kronenberg et al. | Nov. 4, 1947 |